United States Patent
Barney et al.

[11] 3,891,989
[45] June 24, 1975

[54] RADAR CONFUSION COUNTERMEASURE SYSTEM

[75] Inventors: Kay H. Barney, Roslyn Heights; John M. Lester, Garden City, both of N.Y.

[73] Assignee: Sperry Rand Corporation, New York, N.Y.

[22] Filed: Jan. 27, 1959

[21] Appl. No.: 789,444

[52] U.S. Cl. .............................................. 343/18 E
[51] Int. Cl.² ......................................... H04K 3/00
[58] Field of Search .................... 343/17.7, 18, 18 E

[56] References Cited
UNITED STATES PATENTS
2,440,253   4/1948   Dodington ............................ 343/18

*Primary Examiner*—T. H. Tubbesing
*Attorney, Agent, or Firm*—Howard P. Terry

EXEMPLARY CLAIM

5. In a radar countermeasure system, means for generating a local signal containing frequency components common to those of received pulsed microwave radar signals, means for gating the output of said means for generating, means for detecting said received pulsed microwave signals, a plurality of pulse delay means, each said delay means introducing a unique delay in the detected pulse signal applied thereto, a plurality of gating circuits equaling in number the number of said plurality of pulse delay means, each of said gating circuits when actuated applying the output pulse from said detector to a respective one of said plurality of pulse delay means, means for substantially randomly actuating said gating circuits, means for combining the outputs of said delay means to produce a control signal, said control signal actuating said means for gating, and means for transmitting the output of said gating means.

6 Claims, 3 Drawing Figures

INVENTORS
KAY H. BARNEY
JOHN M. LESTER
BY
ATTORNEY

RADAR CONFUSION COUNTERMEASURE SYSTEM

The invention herein described was made in the course of or under a contract or subcontract thereunder, with the Department of the Air Force.

The present invention relates to radar countermeasure systems and, more particularly, to a radar confusion countermeasure system for producing on an enemy radar indicator a multitude of false target signals representing apparently random target positional data.

One of the earliest prior art techniques for jamming an enemy radar contemplated the transmission of a wide band noise signal of such great amplitude as to substantially obliterate the true target signals being displayed on the radar enemy indicator. It is recognized, however, that such wide band noise transmission is objectionably wasteful of the available jammer transmitter power and, moreover, may not be completely effective in masking the true target signal.

Another approach to the jamming problem has been to deceive the radar enemy operator rather than to render his receiver ineffectual by the sheer brute force of an overpowering noise signal. In this connection, countermeasure equipment has been provided for the transmission of a relatively small number of pulses, in response to each of the enemy radar pulses, in such a way as to present on the enemy radar indicator a limited number of false target signals lying at predetermined ranges and azimuths relative to the true target signal.

The present invention presents yet another technique for substantially reducing or neutralizing the target detection capabilities of an enemy radar. In accordance with the present invention, means are provided for the production on the enemy radar indicator of a great number of realistic-looking false target signals having apparently random ranges and azimuths.

It is the principal object of the present invention to provide a radar confusion countermeasure system including means for the production of a great number of realistic false target signals on an enemy radar indicator at apparently random ranges and azimuths.

Another object of the present invention is to provide means responsive to received pulses of electromagnetic energy for the transmission of a multiplicity of pulses of electromagnetic energy having substantially random time relationships with respect to the received pulses of electromagnetic energy.

A further object is to provide means for the generation of a varying number of pulses of electromagnetic energy in response to each of a received plurality of signal pulses, the produced pulses being randomly modulated in amplitude.

An additional object is to provide radar confusion countermeasure equipment for the production of false target data on a radar enemy indicator to effectively camouflage the identity of the true radar target detector.

These and other objects of the present invention, as will appear upon the reading of the following specification, are achieved in a representative embodiment of the present invention by the provision of a wide band microwave signal receiver capable of detecting pulses radiated from the main, side and back lobes of the enemy radar antenna. The wide band receiver has an input-output characteristic such that the output pulses have substantially the same durations as those of the received input pulses over a wide range of input pulse amplitudes. Means are provided in the wide band receiver for selectively responding to received enemy radar pulses which are in predetermined frequency bands. The selected and detected pulse outputs from the wide band receiver are then applied to a special pulse generator which produces a varying number of output pulses, in response to each of the applied pulses, bearing substantially random time relationships therewith. The substantially random pulses are applied to gate on a transmitter which transmits back to the enemy radar portions of locally generated wide band noise signals. The transmitted portions correspond in frequency to that of the received enemy radar pulses. The pulse signals transmitted back to the enemy radar will be displayed on the enemy radar indicator at substantially random ranges and azimuths together with the true target signal which is reflected by the vehicle carrying the countermeasure system.

For a more complete understanding of the present invention, reference should be had to the following specification and the drawings, in which.

Figure 1:
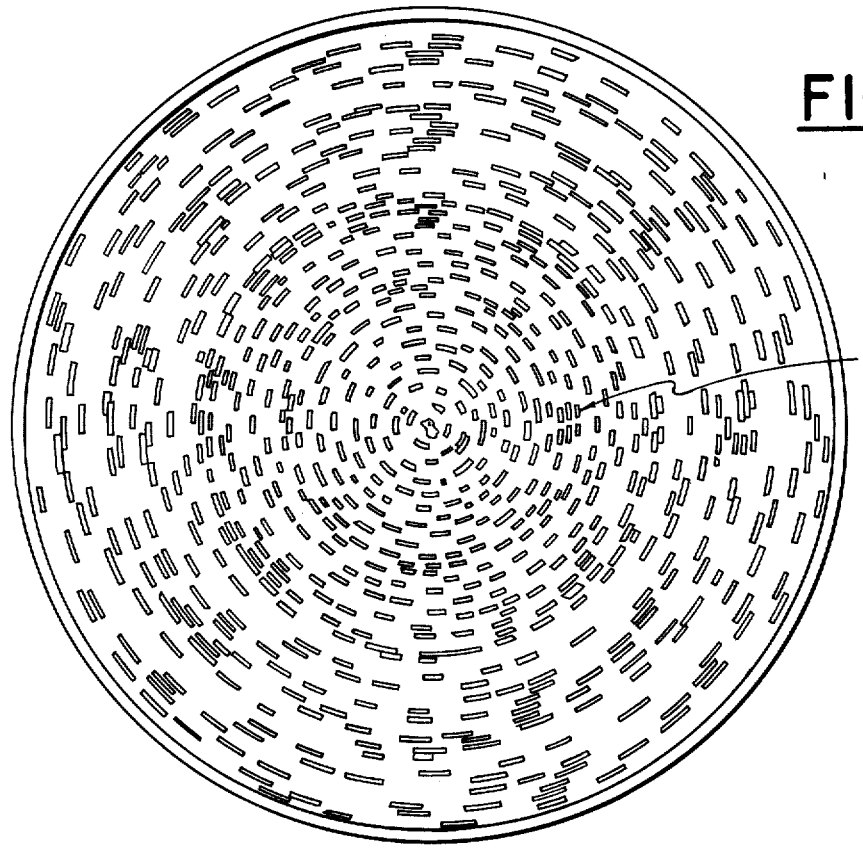
FIG. 1 illustrates a representative enemy radar target display such as will be induced by the countermeasure system of the present invention.

In the representative enemy radar target delay of FIG. 1, the true target signal reflected by the vehicle carrier of the countermeasure system of the present invention is designated by the numeral 1. It will be seen, by comparison of the true target signal 1 with the others of the multiplicity of detected signals, that there is no distinguishing characteristic of the true signal which would facilitate the enemy radar operator's task in discriminating it as against all of the other signals. That is, the radial and arcuate dimensions of the false signals (all those other than target 1) are substantially identical to those of the true signal. Moreover, the false target signals are made to appear on the enemy radar indicator at substantially all target ranges and target azimuths.

The effect of the presentation of FIG. 1 is at least to delay the enemy radar operator's identification of the true target, assuming that this can be done at all. It should be noted that even if the enemy radar operator would succeed in ultimately distinguishing the true target signal from the multiplicity of false targets, one of the principal objectives of the countermeasure system, which is to delay the identification of the true target, will have been achieved. Any delay in the isolation of the true target from the multiplicity of false targets will permit vehicles (such as aircraft) carrying the countermeasure equipment to further penetrate the enemy radar defense perimeter. In an actual tactical situation, not only will the vehicle carrying the countermeasure equipment be protected but the ranges and azimuths of neighboring vehicles moving in formation with it will be masked as well. Thus, the neighboring vehicles need not carry such countermeasure equipment.

Figure 2:
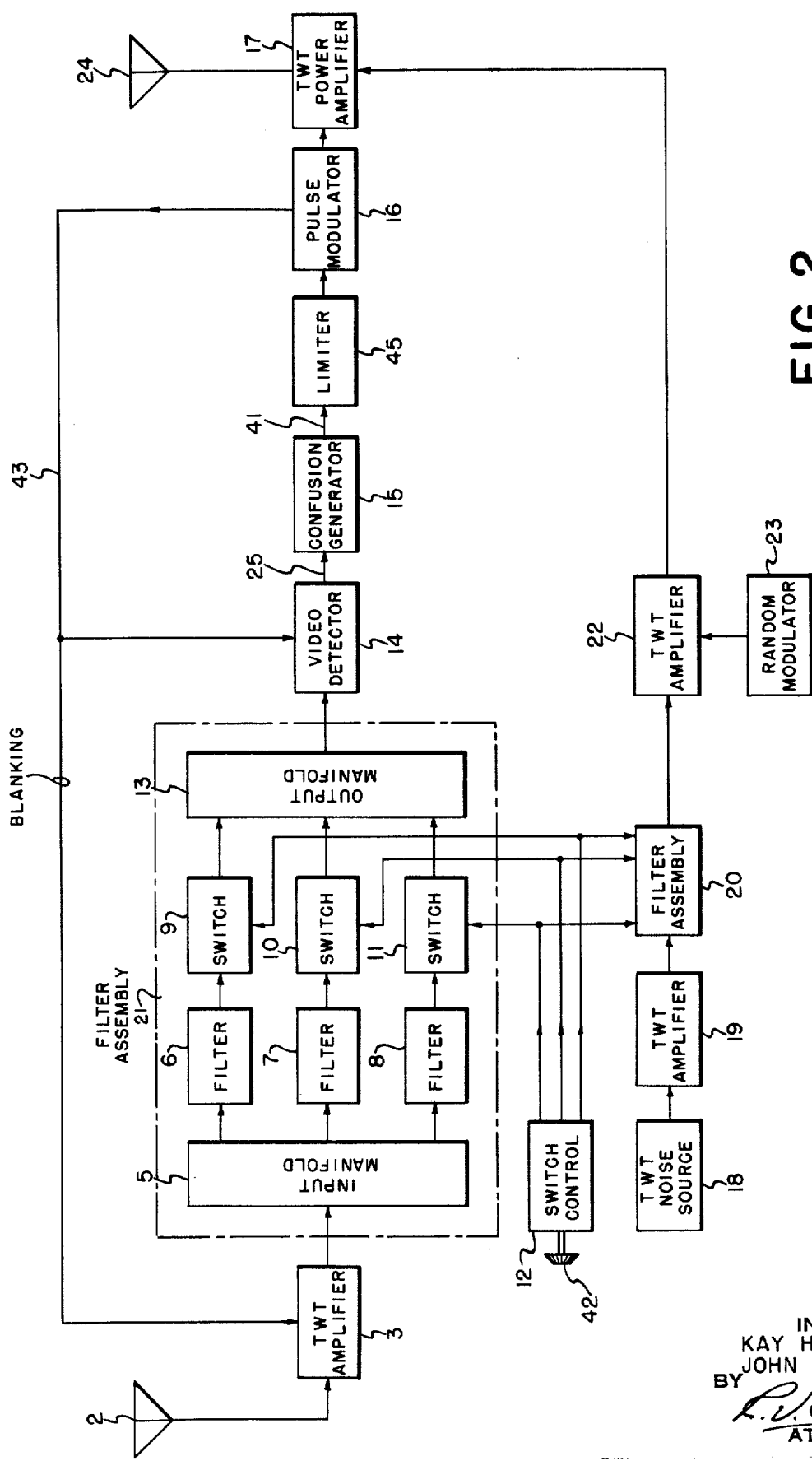
FIG. 2 is a simplified block diagram of a preferred embodiment of the present invention.

FIG. 2 illustrates a preferred embodiment of the present invention for producing the false target data display of FIG. 1. In the course of explaining the operation of the apparatus of FIG. 2, it will be assumed that the enemy radar to be jammed is operating in a continuous azimuth scanning mode which is generally the case with search radars. As is well understood in the art, groups of radar pulses are received from such azimuth-scanning radar, the individual pulses occurring at the radar repetition rate. The number of pulses in each group is determined by the radar pulse repetition rate, the radar beam width and the radar azimuth scanning rate, while the envelope of the group of pulses is determined by the radar beam pattern. Of course, a group of such pulses will be received each time that a lobe of detectable amplitude transverses the position of antenna 2 at the location of the countermeasure equipment.

Referring to FIG. 2, each of the pulses of each group of enemy radar pulses is received by antenna 2 and amplified by travelling wave tube amplifier 3. The microwave signal output of amplifier 3 is applied to input manifold 5 having a discrete plurality of output microwave channels into each of which is placed a respective one of microwave band pass filters 6, 7 and 8. Only three such filters are shown by way of example, but it will be understood that additional ones may be provided for particular applications where the band pass of amplifier 3 is to be divided into a larger number of component frequency bands. The technique of channelizing a received signal according to its frequency content is well known and is generally referred to in the art as multiplexing. Suitable means for performing this multiplexing function, comprising the input manifold 5 and band pass filters 6, 7 and 8 is described in U.S. Pat. No. 2,686,902.

The output of each of the filters 6, 7 and 8 is applied to a respective one of conventional microwave switches 9, 10 and 11. Each switch is responsive to a respective control signal derived from switch control 12 for being rendered conductive or nonconductive. A suitable switch may comprise a cavity resonator having shorting means actuated by a respective control signal output of switch control 12. When any of switches 9, 10 and 11 are rendered conductive, its respectively associated microwave signal input, if any, is applied to output manifold 13. Manifold 13 is substantially identical to input manifold 5 previously discussed.

The microwave signals present at the output of switches 9, 10 and 11 are combined in output manifold 13 and applied to the input of video detector 14. Assuming, for example, that channel switch 9 has been rendered conductive by the generation of an appropriate control signal in switch control 12 and that an enemy radar signal having a carrier lying with the band pass of filter 6 is received, a sequence of detected video pulses will be produced at the output of detector 14 corresponding to the received sequence of pulses.

Figure 3:
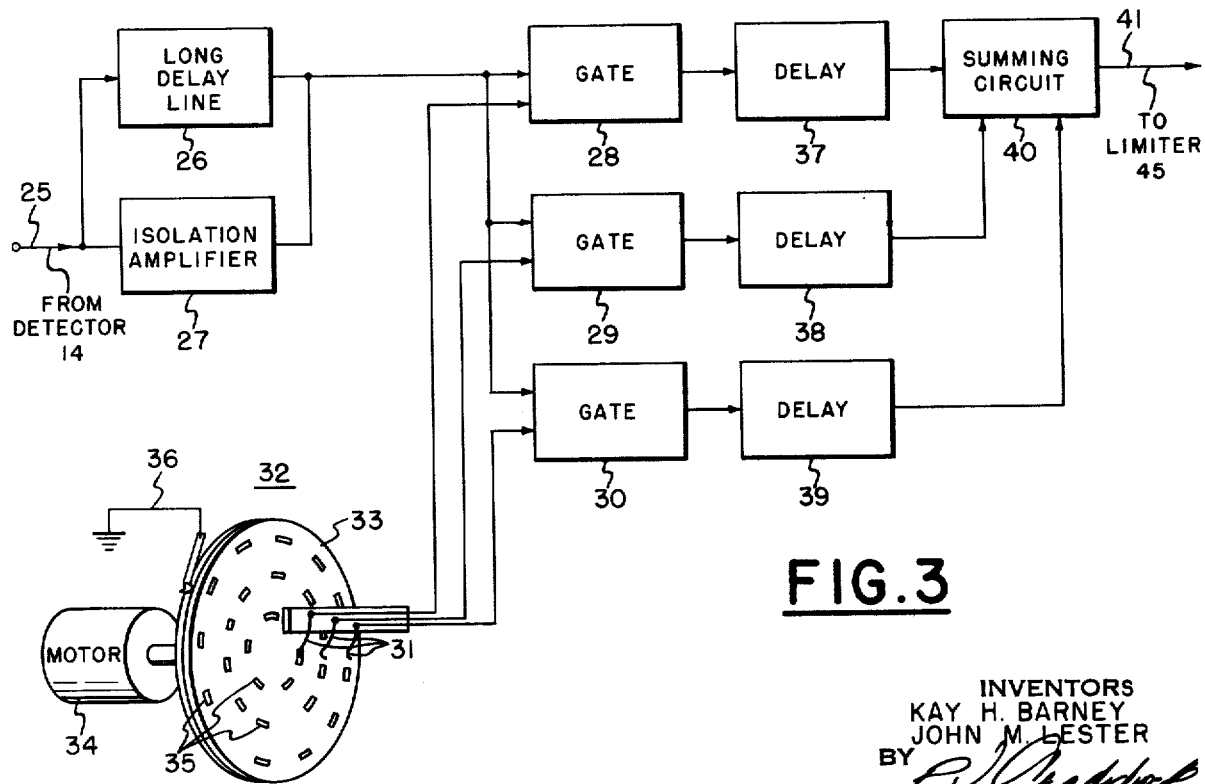
FIG. 3 is a block diagram of the confusion generator component of the apparatus of FIG. 2.

The detected video pulses at the output of detector 14 are applied to the input of confusion generator 15, the details of which are shown in FIG. 3. Briefly, generator 15 produces a varying number of output pulses in response to each of the detected video pulses appearing at the output of detector 14, the produced pulses bearing substantially random time relationships with respect to the occurrence of the associated video pulses. Generally speaking, the time separation between a detected video pulse and the last occurring of the associated pulses produced by generator 15 is substantially less than the order of the radar repetition interval of the enemy radar.

The pulses produced by generator 15 are applied to amplitude limiter 45. Limiter 45 operates to reduce the amplitudes of its input pulses to a common level so as to produce output pulses of substantially the same duration as that of the received enemy pulses irrespective of the amplitude of the received pulses. The output pulses of limiter 45 are applied to pulse modulator 16 which, in turn, is connected to amplitude modulate travelling wave tube power amplifier 17. The pulses produced at the output of modulator 16 are also applied via line 43 to gate off amplifier 3 and detector 14 so as to render the receiving portion of the apparatus of FIG. 2 inoperative during the actuation of power amplifier 17. The carrier signal input to power amplifier 17 is ultimately derived from travelling wave tube 18 which is utilized as a local generator of a wide band of noise signals. The band is selected to embrace all the discrete carrier frequencies known to be used by the enemy radars against which the countermeasure equipment of the present invention is to be employed.

The wide band noise signals generated by source 18 is amplified in travelling wave amplifier 19 and applied to the input of filter assembly 20. Filter assembly 20 may be substantially identical to filter assembly 21, the latter consisting of the previously discussed components including input manifold 5, band pass filters 6, 7 and 8, switches 9, 10 and 11, and output manifold 13. The filters included within filter assembly 20 preferably correspond in number and in band pass frequency to the corresponding filters 6, 7 and 8 of filter assembly 21. Switch control 12 determines the conduction of each of the switches included in assembly 20 in identical fashion to its control of corresponding switches 9, 10 and 11 of assembly 21. That is, if switch 9 of assembly 21, for example, is rendered conductive by switch control 12, then a respectively corresponding frequency channel one of the switches included in the assembly 20 will be rendered conductive at the same time.

In an illustrative case, the band pass of each of the filters of assemblies 21 and 20 is adjusted to be 10 megacycles in extent. It has been determined that a train of noise pulses properly generated cannot be distinguished from a train of echo pulses from a true moving target presented on the PPI or A-scope presentation of a radar such as the enemy radar. This is especially true when the effective target echo area is fluctuating as is the case when the target is an incoming aircraft. The use of a medium band width pulse of noise (in this case 10 megacycles wide) obviates the necessity of aligning the transmitter frequency of the confusion countermeasure system accurately with the operating frequency of the enemy radar. The only penalty for this type of operation is that the power received by the enemy radar is diminished by the fraction:

$$\frac{\text{enemy radar receiver band width}}{\text{confusion transmitter band width}}$$

In the illustrative case where one enemy radar is to be confused (jammed), the 10 megacycle band width for the noise pulses represents a good compromise between frequency alignment accuracy and excess transmitted power.

The band of continuously generated noise frequencies selected by filter assembly 20 is applied to travelling wave tube amplifier 22 wherein it is randomly modulated in amplitude by the modulating signal output of random modulator 23. Modulator 23 may comprise a plurality of ordinary low frequency sine wave generators, preferably of poor frequency stability, whose output signals are summed together. For example, three such generators may be used, one having a repetition interval commensurate with the azimuth scanning period of the enemy radar, another having a period approximating the interval during which the countermeasures vehicle is irradiated by the scanning enemy radar main lobe, and the third having a period intermediate the other two.

The randomly modulated noise carrier signal at the output of amplifier 22 is applied to the carrier signal input of power amplifier 17 wherein the continuously generated but randomly amplitude modulated noise signals are gated on and off in response to the pulses produced at the output of pulse modulator 16 as previously described. The pulsed output signals from amplifier 17 are then radiated by antenna 24 back to the enemy radar.

It will be seen that if pulses of fixed amplitude were radiated by antenna 24, the enemy radar operator could determine the azimuth of the countermeasures vehicle simply by noting the azimuth of the maximum amplitude "target" signals. Such maximum amplitude signals would occur when the main lobe of the radar beam was directed along the jammer's azimuth. In order to preclude such ready azimuth determination, modulator 23 is provided which imposes a random variation on the amplitude of the false target pulses. The random amplitude variation of the "target" signals displayed on the enemy indicator will substantially impede the ascertainment of the true azimuth of the countermeasures vehicle.

Referring to FIG. 3, the detected video pulses at the output of detector 14 of FIG. 2 is applied to input line 25 of FIG. 3. Neglecting long delay line 26 for the moment, the detected video pulses are transmitted through isolation amplifier 27 and simultaneously applied to first inputs of gates 28, 29 and 30. Gates 28, 29 and 30 each derive a respective second input signal from a corresponding one of the brushes 31 of rotating commutator 32.

Commutator 32 comprises a disc 33 of nonconducting material which is rotated slowly by motor 34. A number of arcuate segments 35 of electrically conductive material are randomly positioned on the face of disc 33, each of the segments 35 making continuous electrical contact with grounding member 36 during the rotation of disc 33. As fingers 31 make contact with segments 35 during the rotation of disc 33, the ground potential of member 36 is applied to respectively corresponding ones of gates 28, 29 and 30, to which fingers 31 are connected.

Gates 28, 29 and 30 may be conventional video AND gates arranged to be rendered conductive upon the application thereto of a control potential, the control potential in the present illustrative case being ground. Upon the conduction of any one of gates 28, 29 and 30, the detected video pulses at the output of isolation amplifier 27 will be passed to that one of the delay lines 37, 38 and 39 which is connected to the output of the conducting gate. The outputs of delays 37, 38 and 39 are combined in summing circuit 40 and then applied via line 41 to amplitude limiter 45 of FIG. 2.

Each of delay lines 37, 38 and 39 is of unique and independent length so as to delay input video pulses applied thereto by a respective amount. The density in range of the false targets shown in FIG. 1 should be comparable with the distance the vehicle carrying the confusion system travels during one azimuth scan of the enemy radar. For example, assuming an aircraft flying with a velocity of 600 nautical miles per hour on a radial course toward an enemy radar having an azimuth scan rate of 5 scans per minute, the aircraft would move 2 nautical miles per scan or 24.6 microseconds of range on the enemy radar PPI per azimuth scan. Thus, for this illustrative case, the minimum delay increment between the delays produced by delays 37, 38 and 39 should be of the order of 24 to 48 microseconds. In order to produce a realistic motion of the false targets on the enemy radar indicator from scan to scan of the enemy radar in azimuth, it is necessary that the false targets move on the face of the jammed enemy radar at approximately the same velocity as that of the true target signal to avoid any distinguishing characteristics that would disclose the identity of the true target.

The speed of motor 34 is adjusted so that each of the arcuate members 35 remains in contact with its respective one of contacting fingers 31 for a period of time substantially the same as the duration of illumination of the countermeasures equipment by the azimuthally scanning enemy radar beam. Whenever a commutator circuit is completed, the gate to which it is connected is opened, permitting pulses from the detector 14 to pass into the selected delay lines. Any pulses received during this period (the length of time a member 35 contacts a finger 31) continue to pass into the delay line and are transmitted with that delay from the received pulses. In this manner several pulses for each false echo can be transmitted in a row with the same delay by the confusion system, and a false target will be presented on the enemy's PPI presentation. The false target will have approximately the correct number of pulses per "look," imparting to the decoy thus generated not only the correct pulse width, but a realistic azimuth width as well. As previously mentioned, arcuate members 35 are randomly positioned on the face of disc 33 so that the conductive contact to ground of contacting fingers 31 is randomly established. Such randomness, of course, is present only during one complete rotation of disc 33. However, inasmuch as the speed of motor 34 is generally non-synchronous with the azimuth scanning speed of the enemy radar, the sequence of grounding of the contacting fingers 31 will not be the same from azimuth scan to azimuth scan of the enemy radar and the apparent randomness of the false target data on the face of the enemy indicator will be maintained from scan to scan.

In the operation of the apparatus of FIG. 2, a group of pulses is received from the scanning enemy radar each time that a lobe of detectable amplitude sweeps by the position of antenna 2. The gain of amplifier 3 may be made sufficient to respond to such groups of enemy pulses as may be received not only from the main lobe of the enemy scanning beam pattern but also from the side and back lobes as well. The groups of received pulses are passed through filter assembly 21 and detected by video detector 14. It is assumed that the countermeasure equipment operator had previously adjusted switch control 12 by means of control knob 42 to render conductive that one of switches 9, 10 and 11 corresponding to the frequency channel anticipated to be used by the enemy radar.

Each of the detected enemy video pulses is then applied to confusion generator 15 which produces, at the output of summing circuit 40 of FIG. 3, a succession of pulses randomly related in time to each of the detected enemy pulses. The random time relationship is established by the fortuitous position of rotating disc 33 at the time that the enemy pulses are received which, in turn, establishes the particular one or ones of delays 37, 38 and 39 through which the detected pulses will be passed. In an ordinary case, more than one of the contacting fingers 31 will be grounded at the moment of reception of the enemy pulses and so a plurality of differently delayed false target pulses will be produced in summing circuit 40 by commutator 32.

The false target pulses at the output of summing circuit 41 are then amplified in amplifier 17 to a sufficient level so as to be detected by the enemy radar irrespective of the azimuth position of the enemy radar at the time of reception of the false target signals. That is, the false target signals are of such an amplitude as to "come in" on even the side and back lobes of the enemy radar antenna. The result is that the false target signals are displayed not only at false ranges but at erroneous azimuths as well because of the ability of the countermeasure receiver to detect enemy pulses emanating from minor antenna lobes and to transmit back to the enemy radar false target signals of amplitude sufficient to be received on said minor lobes.

It will be recalled that the maximum delay interposed by any of the delays 37, 38 and 39 is substantially less the radar repetition interval of the enemy radar. The effect on the enemy radar indicator resulting from the use of such short delay lines is to present false target data which lie at ranges equal to or exceeding the range of the true target signal but less than the maximum range displayed on the radar indicator. One or more long delay lines, such as long delay 26 of FIG. 3, having delays only slightly less than the repetition interval of the enemy radar can be used to generate second-time-around target patterns. The second-time-around patterns will tend to "fill in" the area intervening the origin of the enemy PPI and the range at which the true target signal is presented.

It will be seen from the preceding specification that the objects of the present invention have been achieved by the provision of a radar confusion countermeasure for receiving enemy radar pulses transmitted by any of the main or secondary lobes of the enemy beam pattern and for generating in response thereto a great multiplicity of realistic false target signals lying at apparently random ranges and azimuths with respect to those of the true target signal. The resulting confused pattern of target data effectively reduces the enemy radar operator's ability to ascertain the position of the actual target vehicle which carries the countermeasure equipment. Not only is the target vehicle itself protected by the confused target pattern on the enemy indicator but neighboring vehicles are camouflaged as well.

Although manual means have been shown for purposes of simplicity and clarity in FIG. 2 for determining the conductivity of the switches of filter assemblies 21 and 20, it will be recognized that the present invention is readily applicable for use in fully automatic countermeasure systems, such as disclosed in copending patent application Ser. No. 543,647, filed on Oct. 31, 1955, in the names of John M. Lester, Philip W. Crist and Charles E. O'Toole and assigned to the present assignee. The countermeasure system of Ser. No. 543,647 is operative to automatically and substantially instantaneously ascertain the limited band of frequencies in which the unknown frequency enemy radar signal is present and to render conductive corresponding ones of the switches of the filter assembly in accordance therewith.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus comprising wide band pulsed microwave signal receiving means, first filter means connected to said receiving means for directing the pulsed signal output therefrom into respective microwave frequency channels according to frequency content, first signal combining means, each said frequency channel including a switch for selectively connecting its respective channel to said first signal combining means, a detector connected to the output of said first signal combining means, a plurality of pulse delay means, each said delay means introducing a unique delay in the pulse respectively applied thereto, a plurality of gating circuits equaling in number the number of said plurality of pulse delay means, each of said gating circuits when actuated applying the output pulse from said detector to a respective one of said plurality of pulse delay means, means for substantially randomly actuating said gating circuits, second signal combining means for combining the outputs of said plurality of delay means, a source of local signals commensurate in frequency extent with that of said wide band receiving means, second filter means connected to said local signal source for directing the outputs therefrom into respective local signal channels according to frequency content, third signal combining means, each said local signal channel including a switch for selective connection to said third signal combining means, means for selectively actuating the switches of said microwave and local signal channels in corresponding frequency pairs, gated amplifying means connected to the outputs of said second and third signal combining means, said gated amplifying means being actuated by the output of said second signal combining means for amplifying the output of said third signal combining means, and antenna means for radiating the output of said gated amplifying means.

2. Apparatus as defined in claim 1 and further including amplitude modulating means for connecting the output of said third signal combining means to said gated amplifying means, and a source of random amplitude modulating signals connected to said amplitude modulating means, said amplitude modulating means amplifying the output of said third signal combining means in accordance with the output of said source of random amplitude modulating signals.

3. Apparatus as defined in claim 1 and further including means connected to the output of said second signal combining means for applying the pulses produced thereat to said wide band receiving means for rendering said wide band receiving means inoperative during an interval determined by the duration of said last-named pulses.

4. In a radar countermeasure system, means for gating the output of a noise signal source included within said countermeasure system, said means for gating comprising means for detecting pulsed microwave signals of substantially the same frequency as that of said noise signal source received from a radar, a plurality of pulse delay means, each said delay means introducing a unique delay in the detected pulse signal applied thereto, a plurality of gating circuits equaling in number the number of said plurality of pulse delay means, each of said gating circuits when actuated applying the output pulse from said detector to a respective one of said plurality of pulse delay means, means for substantially randomly actuating said gating circuits, means for combining the outputs of said plurality of delay means, and gated amplifying means actuated by the output of said combining means for gating the output of said noise signal source.

5. In a radar countermeasure system, means for generating a local signal containing frequency components common to those of received pulsed microwave radar signals, means for gating the output of said means for generating, means for detecting said received pulsed microwave signals, a plurality of pulse delay means, each said delay means introducing a unique delay in the detected pulse signal applied thereto, a plurality of gating circuits equaling in number the number of said plurality of pulse delay means, each of said gating circuits when actuated applying the output pulse from said detector to a respective one of said plurality of pulse delay means, means for substantially randomly actuating said gating circuits, means for combining the outputs of said delay means to produce a control signal, said control signal actuating said means for gating, and means for transmitting the output of said gating means.

6. Apparatus comprising means for receiving pulsed microwave signals, means for generating a local signal containing frequency components common to those of said received pulsed microwave signals, a detector connected to the output of said receiving means, a plurality of pulse delay means, each said delay means introducing a unique delay in the pulse respectively applied thereto, a plurality of gating circuits equaling in number the number of said plurality of pulse delay means, each of said gating circuits when actuated applying the output pulse from said detector to a respective one of said plurality of pulse delay means, means for substantially randomly actuating said gating circuits, means for combining the outputs of said plurality of said pulse delay means, and gated amplifying means actuated by the output of said combining means for gating the output of said local signal generating means.

* * * * *